(12) United States Patent
Lee (10) Patent No.: US 11,598,738 B2
(45) Date of Patent: Mar. 7, 2023

(54) APPARATUS AND METHOD FOR DETECTING DEFECTIVE COMPONENT USING INFRARED CAMERA

(71) Applicant: Samsung Electronics Co., Ltd., Suwon-si (KR)

(72) Inventor: Dongik Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/984,762

(22) Filed: Aug. 4, 2020

(65) Prior Publication Data
US 2021/0055241 A1 Feb. 25, 2021

(30) Foreign Application Priority Data

Aug. 20, 2019 (KR) .................. 10-2019-0101522

(51) Int. Cl.
*G01N 25/72* (2006.01)

(52) U.S. Cl.
CPC .................. *G01N 25/72* (2013.01)

(58) Field of Classification Search
CPC .................................................. G01N 25/72
USPC .............. 374/4, 121, 57, 124, 137, 112
See application file for complete search history.

(56) References Cited

U.S. PATENT DOCUMENTS

| | | | | |
|---|---|---|---|---|
| 2003/0219059 A1* | 11/2003 | Scott | ............... | G01N 25/72 374/5 |
| 2014/0159759 A1 | 6/2014 | Karita | | |
| 2015/0260667 A1* | 9/2015 | Isakov | ............... | G01N 25/72 374/5 |
| 2018/0284155 A1 | 10/2018 | Beng et al. | | |
| 2018/0288161 A1 | 10/2018 | Saxena et al. | | |
| 2018/0293524 A1 | 10/2018 | Nuszen et al. | | |
| 2018/0320545 A1 | 11/2018 | Dardona | | |
| 2018/0326143 A1 | 11/2018 | Hyde et al. | | |
| 2018/0340884 A1 | 11/2018 | Roodenko | | |
| 2018/0348121 A1 | 12/2018 | Deliwala | | |
| 2018/0364153 A1 | 12/2018 | Carr | | |

(Continued)

FOREIGN PATENT DOCUMENTS

| | | | | |
|---|---|---|---|---|
| DE | 10201973 A1 * | 8/2002 | ............ | G01N 25/72 |
| DE | 102019124344 A1 * | 3/2021 | ............ | G01N 25/72 |

(Continued)

OTHER PUBLICATIONS

International Search Report (PCT/ISA/210) and Written Opinion of the International Searching Authority (PCT/ISA/237) dated Nov. 30, 2020, in corresponding International Patent Application No. PCT/KR2020/010407.

*Primary Examiner* — Mirellys Jagan
(74) *Attorney, Agent, or Firm* — Staas & Halsey LLP (57) ABSTRACT

Disclosed is an apparatus for detecting a defective component includes an infrared camera configured to capture an image of a test-target component in a production process, and a processor configured to measure a temperature of the component based on the image captured by the infrared camera and identify that the component of which temperature is out of a range of a reference value is defective. In addition, a database of various causes of defect is established, and an expected cause of defect for a defective component or a retest component is reasoned out from the database based on the measured temperature.

16 Claims, 5 Drawing Sheets

(56) References Cited

U.S. PATENT DOCUMENTS

2019/0091501 A1 3/2019 Fernstrum et al.
2019/0129519 A1 5/2019 Zhao et al.

FOREIGN PATENT DOCUMENTS

| | | | |
|---|---|---|---|
| JP | 2013-053981 A | | 3/2013 |
| KR | 10-0500632 B1 | | 7/2005 |
| KR | 10-2009-0057518 A | | 6/2009 |
| KR | 10-2009-0130919 A | | 12/2009 |
| KR | 20110026047 A | * | 3/2011 |

* cited by examiner

FIG. 5

APPARATUS AND METHOD FOR DETECTING DEFECTIVE COMPONENT USING INFRARED CAMERA

CROSS-REFERENCE TO RELATED THE APPLICATION

This application is based on and claims priority under 35 U.S.C. § 119 to Korean Patent Application No. 10-2019-0101522 filed on Aug. 20, 2019 in the Korean Intellectual Property Office, the disclosure of which is incorporated by reference herein in its entirety.

BACKGROUND

Field

The disclosure relates to an apparatus and method for detecting a defective component and more particularly, to an apparatus and method for identifying whether a component is defective by capturing an image of the component with an infrared camera in a component production process.

Description of the Related Art

Electronic apparatus components, such as a printed circuit board (PCB), are subjected to a process of identifying whether the components are defective in a production process. As a defective component detection method, a method of applying, for example, various test signals to a component and identifying whether the component outputs normal results is generally used.

As another defective component detection method, a method of measuring the degree of heat emitted by a component with an infrared camera may be taken into consideration. When the degree of heat exceeds a normal range, a corresponding component may be identified as a defective component. However, the heat measurement method employing an infrared camera is conventionally used for heat checking only in a component development step and is not used to identify whether each individual component is defective in a production process of a fully developed component.

Also, several types of defects may occur in a production process. However, conventionally, only a method of selecting a normal component by identifying whether a component is defective is taken into consideration, and a method of detecting the cause of defect is not suggested. In a defective product detection process, similar phenomena may be caused by the same type of defects. Therefore, when phenomena occurring in tests of defectiveness are categorized, it may be possible to reason out a cause of defect for a detected defective component. However, conventional defect detection methods do not provide such a function.

SUMMARY

An aspect of one or more exemplary embodiments is to provide a method of identifying whether a component is defective by measuring the degree of heat emitted by the component with an infrared camera in a component production process.

Another aspect of one or more exemplary embodiments is to provide a method of reasoning out a cause of defect for a defective component which is detected with an infrared camera.

According to an example embodiment, a method of detecting a defective component, the method comprising: (a) applying driving power to a test-target component; (b) measuring a temperature of the test-target component, to which the driving power is applied, with an infrared camera; (c) comparing data of the measured temperature with a predetermined reference value of a normal component; and (d) identifying the test-target component, which deviates from the reference value as a comparison result of the step (c), as a defective component.

In the step (c), the predetermined reference value may comprise at least one of: a reference temperature of the normal component at a specific time point; a difference value between temperatures measured at a plurality of time points after power is applied to the normal component; and a temperature change rate measured after the power is applied to the normal component.

The method may further comprise: (e) generating distribution data of temperatures of a plurality of test-target components, which are identical to the test-target component, measured in the step (b); (f) comparing the data of the temperature measured in the step (b) with the distribution data; and (g) identifying the test-target component as a retest component based on deviation from a distribution range corresponding to the normal component as a comparison result of the step (f).

The step (f) and the step (g) may be performed on the test-target component which is not identified as a defective component in the step (d).

The method may further comprise: (h) applying the driving power to the retest component for a predetermined time or more until the retest component has a saturated operation temperature; and (i) re-identifying whether the retest component is a defective component by measuring the saturated operation temperature.

The method may further comprise: (j) generating a cause-of-defect database for a plurality of retest components, which are identical to the retest component, by storing a cause of defect identified by an actual test result of the test-target component, which is identified as the defective component in the step (d) or identified as the retest component in the step (g) and then finally identified as the defective component, together with information on a position in the distribution data.

The method may further comprise: (k) identifying an expected cause of defect for the test-target component by consulting the cause-of-defect database built in the step (j) for the comparison result of the step (c) or the step (f).

The step (b) may comprise measuring a temperature of each of a plurality of regions obtained by dividing an entire region of the test-target component, and the step (c) may comprise comparing a temperature measured from each of the regions with a reference value provided for each of the regions.

The step (b) and the step (c) may be performed on only some of the regions.

According to an example embodiment, an apparatus for detecting a defective component, the method comprising: an infrared camera configured to capture an image of a test-target component to which driving power is applied; a storage unit configured to store a predetermined reference value of a normal component; and a processor configured to measure a temperature of the test-target component based on the image received from the infrared camera, compare data of the measured temperature with the reference value stored in the storage unit, and identify whether the test-target component is a defective component based on a comparison result.

The reference value may comprise at least one of: a reference temperature of the normal component at a specific time point; a difference value between temperatures measured at a plurality of time points after power is applied to the normal component; and a temperature change rate measured after the power is applied to the normal component.

The storage unit may store distribution data of temperatures of a plurality of test-target components, which are identical to the test-target component, measured by the processor, and the processor may compare data of the measured temperatures with the distribution data stored in the storage unit and identify the test-target component as a retest component based on deviation from a distribution range corresponding to the normal component.

The processor may identify whether the test-target component which is not identified as a defective component corresponds to a retest component.

The processor may re-identify whether the retest component is a defective component based on a saturated operation temperature after the driving power is applied to the retest component until the retest component has the saturated operation temperature.

The storage unit may store a cause-of-defect database by storing a cause of defect identified by an actual test result of the test-target component, which is identified as the defective component by the identification unit or identified as the retest component and then finally identified as the defective component by the identification unit, together with information on a position in the distribution data.

The processor may consult the cause-of-defect database stored in the storage unit for data of the temperature measured from the test-target component, which is identified as the defective component or the retest component, and identify an expected cause of defect for the test-target component based on a consulting result.

The processor may measure a temperature of each of a plurality of regions obtained by dividing an entire region of the test-target component and compare a temperature measured from each of the regions with a reference value provided for each of the regions.

The processor may measure temperatures of only some of the plurality of regions and compare the temperatures with reference values separately provided for the regions.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, various embodiments of the disclosure will be described in detail with reference to the drawings. Throughout the drawings, like reference numerals or signs represent components performing substantially the same function. In the drawings, the size of each component may be exaggerated for clarity and convenience of description. However, the technical spirit, fundamental configuration, and effects of the disclosure are not limited to configurations or effects described in the following embodiments. In describing the disclosure, detailed description of a well-known art or configuration related to the disclosure will be omitted when it is deemed to unnecessarily obscure the gist of the disclosure.

In this specification, the terms "comprise," "include," "have," "may comprise," "may include," "may have," etc. indicate the presence of corresponding characteristics (e.g., values, functions, operations, or components such as parts) and do not preclude the presence of additional characteristics.

In this specification, the terms "A or B," "at least one of A or/and B," "one or more of A or/and B," etc. may include all possible combinations of items enumerated with them. For example, "A or B," "at least one of A or/and B," and "one or more of A or/and B" may mean (1) including at least one A, (2) including at least one B, or (3) including both at least one A and at least one B.

In embodiments of the disclosure, the terms including ordinal numbers, such as "first" and "second," are used only for distinguishing one element from other elements. Singular expressions, unless clearly defined otherwise in context, include plural expressions.

In embodiments of the disclosure, the terms including "upper portion," "lower portion," "left side," "right side," "internal side," "external side," "internal surface," "external surface," "front side," "backside," etc. are defined based on the drawings, and the shape or location of each component is not limited by the terms.

As used herein, the phrase "configured (or set) to" may be interchangeably used with, for example, "suitable for," "having the capacity to," "designed to," "adapted to," "made to," or "capable of" according to the situation. The phrase "configured (or set) to" may not necessarily represent only "specifically designed to" in terms of hardware. Instead, in a certain situation, the phrase "a device configured to" may represent that the device is "capable of" in conjunction with other devices or components. For example, the phrase "a sub-processor configured (or set) to perform A, B, and C" may refer to a dedicated processor (e.g., an embedded processor) for performing the corresponding operation or a generic-purpose processor (e.g., a central processing unit (CPU) or an application processor) which can perform the corresponding operations by executing at least one software program stored in a memory device.

Figure 1:
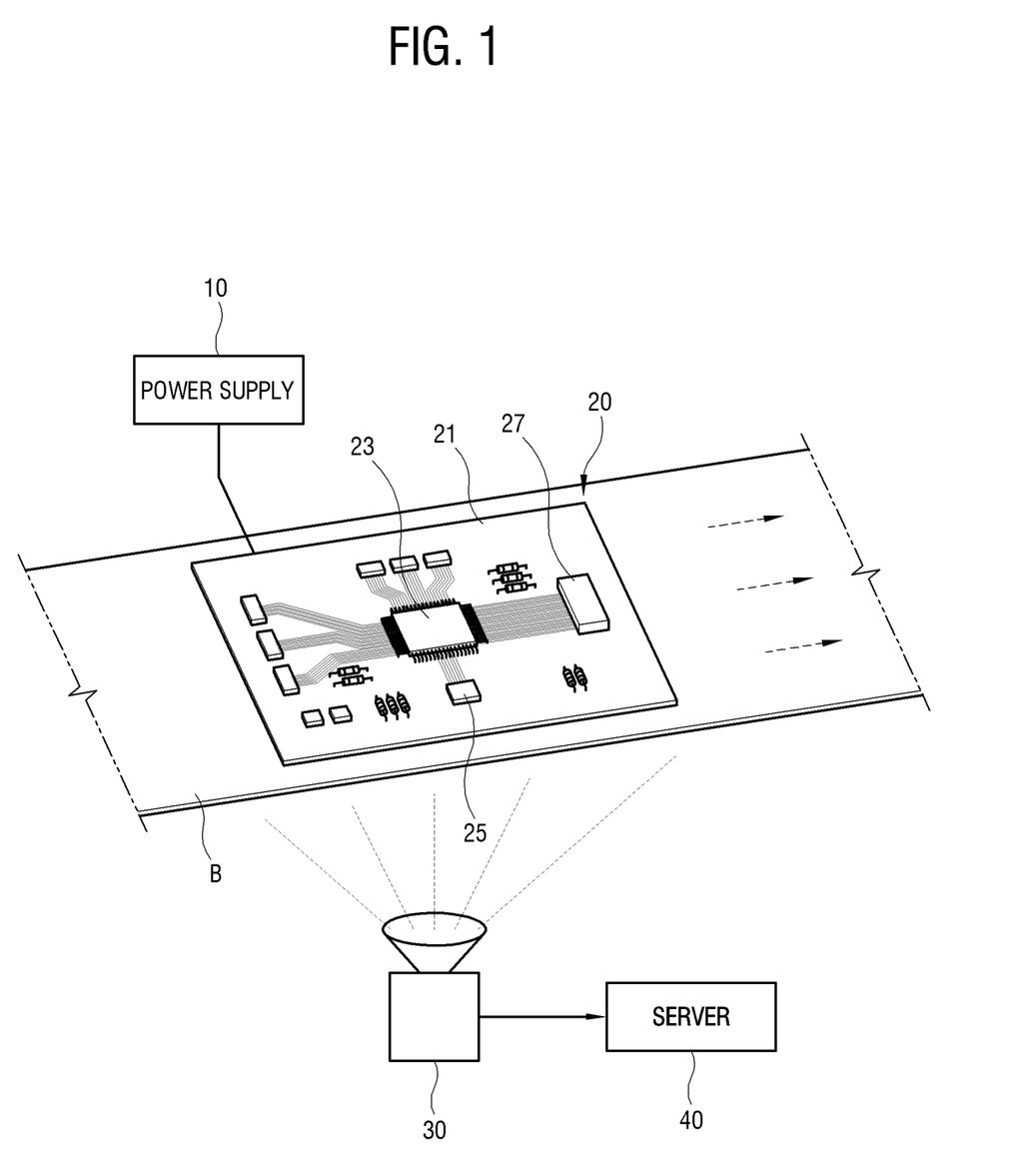
FIG. 1 is a diagram showing a situation in which an apparatus for detecting a defective component according to the disclosure captures an image of a test-target component to detect a defective component in a component production process.

FIG. 1 is a diagram showing a situation in which an apparatus for detecting a defective component according to the disclosure captures an image of a test-target component to detect a defective component in a component production process.

In an embodiment of the disclosure, a test-target component of which defectiveness is tested is exemplified by a printed circuit board (PCB) board assembly (PBA). A PBA 20 is a component provided in substantially every electronic apparatus and includes a PCB 21 having a circuit pattern, an integrated circuit (IC) 23 installed on the PCB 21, and various elements 23 and 25, such as a capacitor and a coil, installed on the PCB 21. The PBA 20 has a heat dissipation means, such as a heat sink, for heat dissipation. Heat generated in the PBA 20 is one of factors which severely threaten normal operation of an electronic apparatus, and thus the PBA 20 is designed at least to maintain a certain temperature or less during normal operation. Power is applied to the PBA 20 to operate the PBA 20. In this case, when heat higher than a reference temperature is generated, the test-target PBA 20 may be identified as defective.

The PBA 20 to be tested is conveyed on a conveyor belt B in the production process and temporarily stopped for a test at a test location at which the test is carried out. At the test location, a power supply 10 is provided, and the PBA 20 present at the test location is connected to the power supply 10 and supplied with power accordingly. In consideration of productivity, a necessary time for a test is generally set to a predetermined time, for example, 15 seconds, for each individual component. When power is supplied to the PBA 20, the PBA 20 operates, and each component on the PBA 20 begins heating up accordingly. The disclosure proposes a method of identifying whether a component is defective by observing heat emission after power is applied to the PBA 20.

Figure 2:
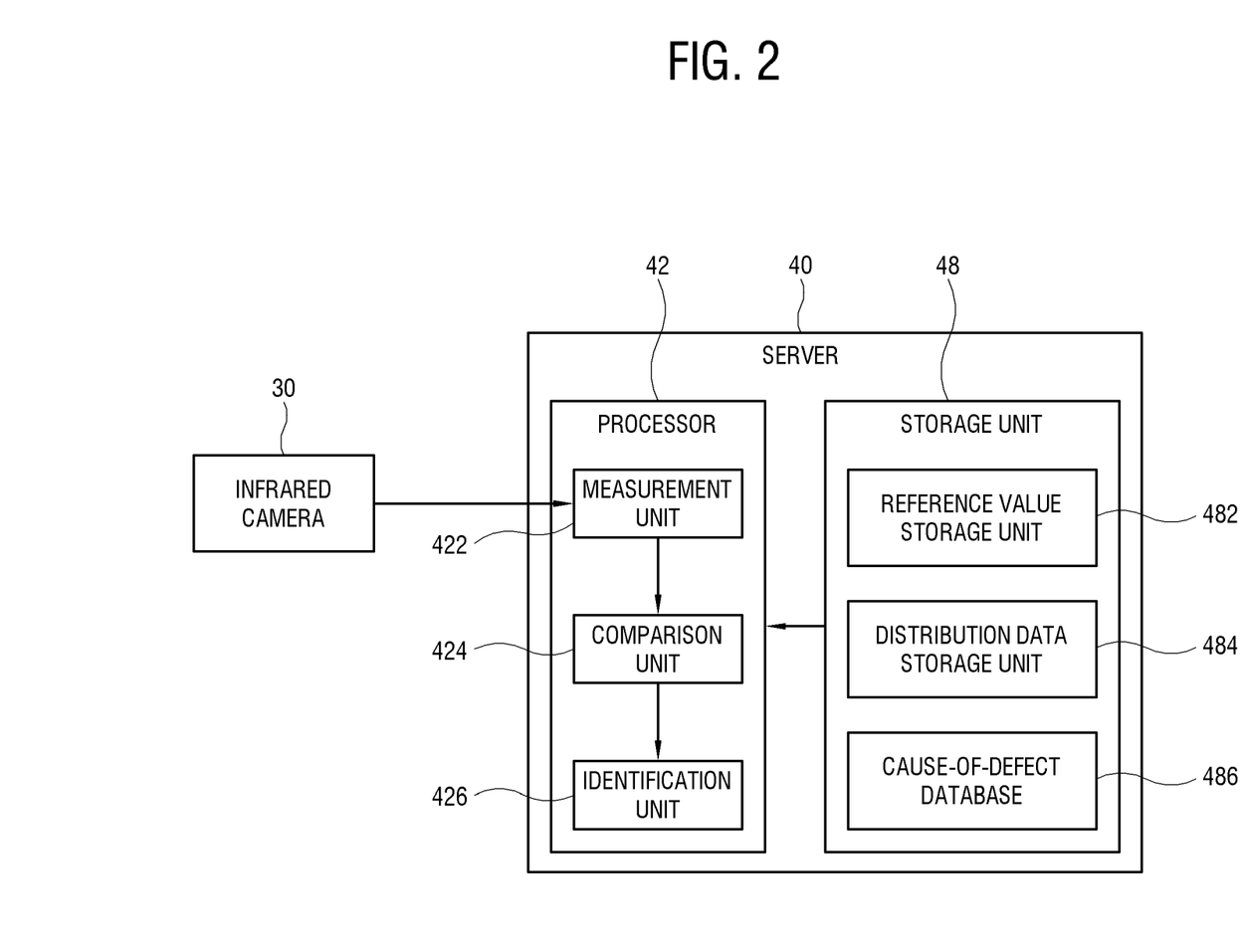
FIG. 2 is a block diagram of an apparatus for detecting a defective component according to the disclosure.

FIG. 2 is a block diagram of an apparatus for detecting a defective component according to the disclosure. The apparatus for detecting a defective component according to the disclosure includes an infrared camera 30 and a server 40.

The infrared camera 30 captures an image of the PBA 20 which is conveyed on the conveyor belt B and put at the test location. The captured image has temperature information. This image is transmitted to the server 40.

The server 40 measures a temperature of the PBA 20 based on the image received from the infrared camera 30 and identifies whether the PBA 20 is defective based on the measured temperature. The server 40 includes a processor 42 and a storage unit 48. The processor 42 may be one computer and may be, for example, a CPU in the computer. The storage unit 48 may be a separate computer having a memory and may be, for example, a hard disk in the computer.

The processor 42 includes a measurement unit 422, a comparison unit 424, and an identification unit 426. Each of the modules 422, 424, and 426 of the server 40 is implemented as software which is run in a computer system. Due to operation of each software module, the processor 42 serves as a device which includes the modules 422, 424, and 426 corresponding to the operation. Also, each of the modules 422, 424, and 426 is shown and described as an independent module which is classified by a function thereof, but the modules 422, 424, and 426 may be configured as one integrated module. For example, the comparison unit 424 and the identification unit 426 may be configured as one module.

The measurement unit 422 calculates a temperature of the PBA 20 based on the image captured by the infrared camera 30. The temperature calculated by the measurement unit 422 becomes a measured temperature value of the PBA 20.

The comparison unit 424 compares data of the temperature measured by the measurement unit 422 with a predetermined reference value stored in the storage unit 48.

The identification unit 426 identifies whether the PBA 20 is defective based on a comparison result of the comparison unit 424.

The storage unit 48 includes a reference value storage unit 482, a distribution data storage unit 484, and a cause-of-defect database 486.

The reference value storage unit 482 stores the predetermined reference value. Here, the reference value is a temperature of a test-target component when the test-target component is a normal component and also is a reference temperature of a normal component at a specific time point. Assuming that a test time required for one PBA 20 is 15 seconds, it is preferable to measure a temperature of the PBA 20, for example, 10 seconds after the power supply supplies power to the PBA 20. Consequently, a reference value is set to a temperature which is obtained 10 seconds after power is applied to a normal component.

The reference value may be set to a value obtained by measuring a temperature of a normal component which is actually manufactured. For example, temperatures are measured 10 seconds after driving power is applied to components which are identified as normal components through various tests among previously manufactured PBAs 20, and the measured temperatures are statistically analyzed to obtain a temperature value of a component which operates normally. The reference value is set to the obtained temperature value. According to another method, the reference value may be set to a maximum allowable temperature of a component in design specifications. An electronic apparatus component, such as the PBA 20, has an allowable temperature value required according to an environment in which an electronic apparatus employing the component will be finally used, and during the development of the component, design specifications are identified in consideration of such requirements. Therefore, when a temperature deviating from such design specifications is measured, the component may be considered to be defective.

As an example, the reference value may be specified as a range 50° C. to 80° C., or by a maximum value, for example, 80° C. or less. Electronic components generally become problematic when their temperatures increase abnormally during operation. Therefore, in general, a maximum value may be generally identified as a reference value, and a component may be identified as a normal component when a measured value does not exceed the maximum value. Meanwhile, when power is applied to an electronic component, the electronic component heats up. Therefore, when the temperature is not increased at all, it is possible to suppose that the electronic component is not supply with power for some reason. Consequently, when the reference value is specified as a range, even such a case where the electronic component does not operate at all can be detected to be defective.

As another example, the reference value may be identified as a difference value between temperatures of a normal component measured at a plurality of time points. For example, the temperatures is measured 1 second and 10 seconds after power is applied, and the reference value is identified as a difference value between the two temperatures. The difference value which is equal to or greater than a predetermined value denotes that the component very drastically heats up, which may be a basis of identifying the corresponding component as being defective.

In this regard, the reference value may be identified as a temperature variation measured after power is applied to a normal component with respect to time, that is, a temperature increase rate. When the reference value is identified as a temperature increase rate, not only temperatures at specific time points, such as 1 second and 10 seconds after power is applied, are taken as bases, and the corresponding component is identified as being defective as long as an increase rate is a predetermined value or more at any time point.

Even in a way in which the reference value is identified as a difference value between measured temperatures and a way in which the reference value is identified as a temperature increase rate, the difference value and the increase rate may also be identified as a range or a maximum value.

The distribution data storage 484 stores distribution data of actually measured temperatures of the PBA 20. The distribution data is statistical information of measured temperature values of each individual PBA 20 which is actually produced in the production process. Most of produced PBAs 20 may be normal components, but some defective components may be included. When temperatures of all the produced components are measured to construct a distribution chart, a normal distribution graph may be obtained as shown in FIG. 3.

Figure 3:
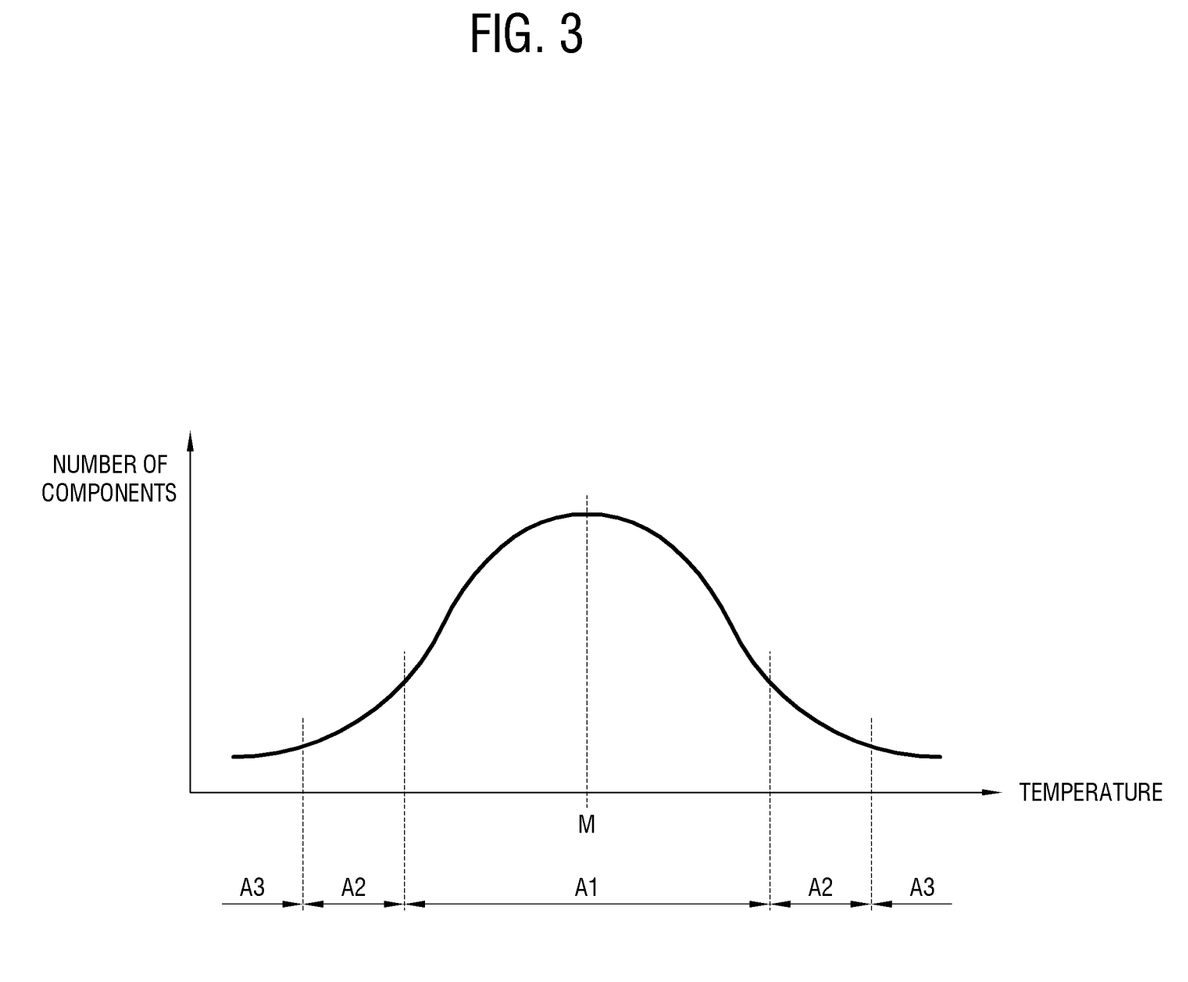
FIG. 3 is a graph of distribution data stored in a distribution data storage unit of FIG. 2.

FIG. 3 is a graph of distribution data stored in a distribution data storage unit of FIG. 2. In the graph, the horizontal axis denotes a measured temperature, and the vertical axis denotes the number of components from which the corresponding temperature is measured. Temperatures of all components measured by the measurement unit 422 based on an image captured by the infrared camera 30 are used as data for constructing the graph of FIG. 3.

In FIG. 3, an area of a predetermined range from the average or a median M of temperatures is defined as a normal area A1, outermost areas on the left and right sides, that is, an area equal to or lower than a specific temperature and an area equal to or greater than a specific temperature, are defined as defective areas A3, and areas between the normal area A1 and the defective areas A3 are defined as retest areas A2. The identification unit 426 identifies a component as a normal component when a temperature measured by the measurement unit 422 is in the normal area A1, identifies the component as a defective component when the temperature is in either of the defective areas A3, and identifies the component as a retest component when the temperature is in either of the retest areas A2.

According to an example of a method of setting points for dividing the areas A1, A2, and A3, an area from the average of temperatures obtained as test results of a plurality of components, that is, the median M of FIG. 3, to points spaced apart from the average by double the standard deviation may be identified as the normal area A1, areas deviating leftward and rightward from the average by triple the standard deviation may be identified as the defective areas A3, and areas between the normal area A1 and the defective areas A3 may be identified as the retest areas A2.

Temperature values of the boundary points for dividing the areas A1, A2, and A3 may be identified experimentally or statistically. In the case of experimental identification, temperatures of components which are finally identified as being defective as test results of, for example, 1000 components may be used to identify points for dividing the defective areas A3. In the case of statistical identification, temperatures of areas spaced apart by triple the standard deviation or more may be used to identify the defective areas A3.

Meanwhile, as described above, the reference value used for identifying whether a component is defective may be a temperature value, a temperature difference value between a plurality of time points, or a temperature increase rate. FIG. 3 shows an example of distribution data generated when the reference value is a temperature value. However, when the reference value is a temperature difference value or a temperature increase rate, the horizontal axis of FIG. 3 denotes a difference value or an increase rate.

When embodiments are actually implemented, only either of the reference value storage unit 482 and the distribution data storage unit 484 may be employed, or both of them may be employed. When only the reference value storage unit 482 is employed, components having a temperature of, for example, 50° C. to 80° C. may be identified as being normal, and other components may be identified as being defective. When only the distribution data storage unit 484 is employed, components having a temperature which is within a range of, for example, double the standard deviation from the median M may be identified as being normal, components having a temperature outside a range of triple the standard deviation may be identified as being defective, and components having a temperature between the ranges may be identified as retest targets. When the both are employed, components having a temperature of, for example, 50° C. to 80° C. may be identified as being normal. Among components having a temperature deviating from the range from 50° C. to 80° C., only components having a temperature deviating from a triple range of the standard deviation from the median M may be identified as being defective, and other components may be identified as retest targets.

The cause-of-defect database 486 is a database for storing the causes of defect specifically identified for test-target components which are identified as defective components. The components identified as defective components include components identified as belonging to the defective areas A3 and components which are finally identified as being defective as results of a subsequent task of identifying whether a component is actually defective among components identified as belonging to the retest areas A2. Components of the defective areas A3 are subjected to another test to detect detailed causes of defect. Also, components of the retest areas A2 are subjected to a retest to identify again whether the components are normal components or defective components, and components identified as defective components are tested to identify the causes of defect. With regard to components which are identified as being defective through such a process, detailed causes of defect are additionally identified. Such identification of the causes of defect may be performed in various ways, for example, identifying whether a normal signal is output from the PBA 20 after a test signal is applied to the PBA 20 and identifying whether a heat dissipation means, such as a heat sink, is attached to the PBA 20 by disassembling the PBA 20.

The identified causes of defect are stored in the cause-of-defect database 486. In the cause-of-defect database 486, information on positions of corresponding test-target components in the distribution data and the causes of defect are recorded in pairs. As information on the positions in the distribution data, temperatures measured by the measurement unit 422 may be used. For example, when a cause of defect is identified as a defective heat sink with regard to a component of which a temperature is measured to be 95° C., the information "95° C.: defective heat sink" is recorded in the cause-of-defect database 486, and when the cause of defect is identified as failure of the IC 23 with regard to a component of which a temperature is measured to be 90° C., the information "90° C.: IC failure" is recorded in the cause-of-defect database 486. As such a method is applied to all components identified as being defective, it is possible to establish a correlation between the actual causes of defect and measured temperatures.

Based on such a correlation, when a measured temperature of a component is 90° C. which corresponds to the retest areas A2, it is possible to identify the component as a retest component and also identify an expected cause of defect as "IC failure." Therefore, in the case of actually retesting components which are identified as retest components, it is first tested whether the IC 23 operates normally among several test items so that the retest components may be rapidly tested without trials and errors. Also, when a measured temperature of a component is 95° C. which corresponds to the defective areas A3, it is possible to identify the component as a defective component and also identify an expected cause of defect as "absence of heat sink." When this cause of defect frequently identified, it may be diagnosed that there is a problem in a heat sink installation line for the production process. Therefore, it is possible to derive a method of lowering a defect rate by checking the heat sink installation line.

A method of detecting a defective component detection process employing the apparatus for detecting a defective component with the above-described configuration according to the disclosure will be described below.

Figure 4:
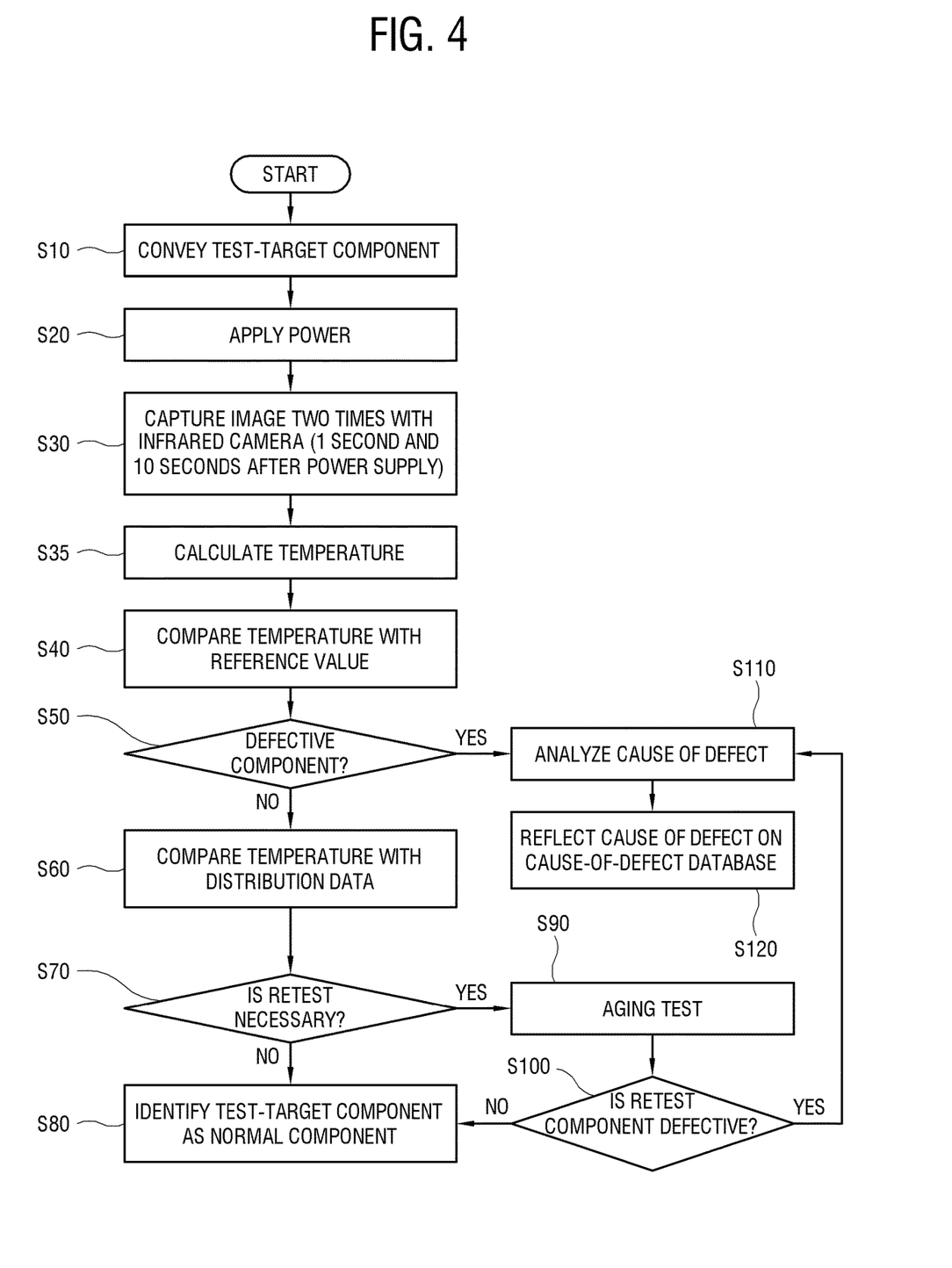
FIG. 4 is a flowchart illustrating a defective component detection process according to the disclosure.

FIG. 4 is a flowchart illustrating a defective component detection process according to the disclosure.

The conveyor belt B conveys a PBA 20 which is a test-target component to the test location and stops the PBA 20 at the test location (S10). At the test location, the power supply 10 is connected to the PBA 20 so that power supply begins (S20).

The infrared camera 30 captures an image of the PBA 20 of which power supply begins (S30). The image is captured two times, and the time points of image capturing are 1 second and 10 seconds after power is applied. The images captured by the infrared camera 30 are transmitted to the server 40 and received by the measurement unit 422 in the server 40.

The measurement unit 422 analyzes the received images and calculates temperatures of the PBA 20 (S35). The calculated temperatures are temperatures obtained 1 second and 10 seconds after power is applied and correspond to measured temperature values of the PBA 20.

The comparison unit 424 compares a temperature measured by the measurement unit 422 with the reference value stored in the reference value storage unit 482 (S40). A target to be compared with the reference value by the comparison unit 424 may be, as described above, a temperature obtained 10 seconds after power is applied, that is, at one time point, a difference value between temperatures obtained 1 second and 10 seconds after power is applied, and a temperature increase rate, which is the increased amount of temperature, during 10 seconds immediately after power is applied.

The identification unit 426 identifies whether the test-target component is a defective component based on the comparison result of the comparison unit 424 (S50). When the test-target component is identified as a defective component by the identification unit 426, a detailed cause of defect of the defective component is analyzed by a worker (S110), and the identified cause of defect is reflected on the cause-of-defect database 486 (S120).

When the storage unit 48 includes the distribution data storage unit 484, the comparison unit 424 consults a distribution data graph stored in the distribution data storage unit 484 as shown in FIG. 3 and compares the measured temperature with the distribution data graph (S60). The distribution data graph consulting process S60 can be performed on only components other than defective components. In other words, components identified as defective components are immediately settled as defective components without the step S60, and the step S60 is additionally performed on components other than the defective components.

The identification unit 426 identifies whether the test-target component requires a retest based on a distribution data consulting result (S70) and identifies the test-target component as a normal component when the test-target component does not require a retest (S80). The component identified as a normal component by the identification unit 426 is transferred to a packaging process, packaged, and then shipped as a product or transferred to an assembly process of an electronic apparatus on which the component will be installed.

The component identified as a retest component by the identification unit 426 is subjected to an aging test so that it may be tested again whether the retest component is actually a defective component (S90). The aging test is a test in which power is applied to the component and status of the component is checked after enough time has passed. For example, after a component operates for about two hours, the component may be in a saturated state where a temperature of the component is referred to as a saturated operation temperature. The saturated operation temperature is a temperature after the component sufficiently operates. When the saturated operation temperature is within a normal range, the temperature of the component may deviate from the normal range due to power supply for a short time at the test location. Even in this case, the component may be identified as a normal component.

The identification unit 426 re-identifies whether the retest component is a defective component based on a saturated operation temperature of the retest component (S100). Re-identification based on the saturated operation temperature may not be performed by the identification unit 426 but may be manually performed by a tester or performed by a separate retest apparatus. In this case, a re-identification result may be input to the processor 42 by, for example, the tester or transmitted from the separate re-test apparatus to the processor. When the component is re-identified as a normal component (S80), the component is shipped as a complete product or transferred to a subsequent assembly process of the component. When the component is re-identified as a defective component, the detailed cause of defect of the defective component is examined (S110), and an identified cause of defect is reflected on the cause-of-defect database 486 (S120).

Meanwhile, in the step S40 or the step S60, the comparison unit 424 may additionally perform a task of consulting the cause-of-defect database 486 for the test-target component which corresponds to a defective component or a retest component. Based on such a consulting result of the comparison unit 424, the identification unit 426 identifies the cause of defect of the defective component or the retest component. The identified cause of defect is externally displayed as the expected cause of defect for the component. Accordingly, a worker may carry out an additional test based on the expected cause of defect to identify the actual cause of defect. Such an expected cause-of-defect derivation process may be performed only on retest components. When the expected cause-of-defect derivation process is performed only on retest components, the advantage is that it is possible to efficiently test a corresponding component to identify whether the component is actually a defective component. When the expected cause-of-defect derivation process is performed on defective components as well, various causes of defect are all reflected on the cause-of-defect database 486 and thus may be used in checking a production line in connection with a frequent cause of defect.

Figure 5:
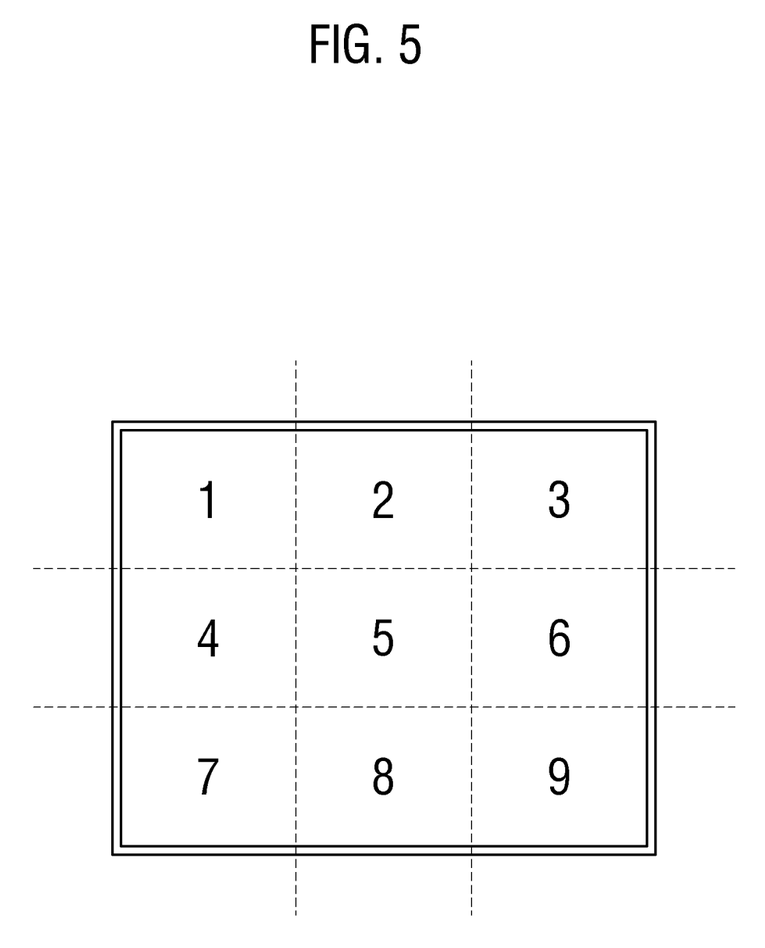
FIG. 5 is a diagram showing an image which is captured by an infrared camera of FIG. 1 and divided into a plurality of regions.

Meanwhile, as a modified example of the above-described embodiment, it is possible to use a method of measuring a temperature of a test-target component for each region. FIG. 5 is a diagram showing an image which is captured by an infrared camera of FIG. 1 and divided into a plurality of regions. The entire area of the PBA 20 of FIG. 1 divided into nine regions 1 to 9 as shown in FIG. 5. The respective regions of the PBA 20 may have different degrees of heat emission depending on the types of components installed on the PBA 20, and accordingly the respective regions may also have different temperatures. The measurement unit 422 divides the image captured by the infrared camera 30 as shown in FIG. 5 and calculates a temperature of each region. The calculated temperature is a measured temperature of each region of the PBA 20.

The comparison unit 424 compares such a measured temperature of each region with reference values stored in the reference value storage unit 482. Also, the comparison unit 424 compares such a measured temperature of each region with distribution data stored in the distribution data storage unit 484. To this end, reference values and distribution data which vary depending on regions are generated and stored in advance in the reference value storage unit 482 and the distribution data storage unit 484.

According to such a method, a temperature abnormality is detected in each region of the PBA 20. Therefore, compared with a case in which one temperature is measured from the entire area, accuracy in detecting a defective component is increased.

In this case, the measurement unit 422 may be configured to measure a temperature of a specific region (e.g., the region 5) only among all the regions 1 to 9, and the comparison unit 424 may be configured to perform a comparison operation for such a specific region only. In the PBA 20, the IC 23 emits the most heat, the other elements 23 and 25 mounted on the board plane emit relatively great heat, and other parts having the circuit pattern emit relatively less heat. Therefore, only a part which emits great heat is set as a region to be measured, and only the region is subjected to measurement and comparison so that a test process may be effectively performed. As an example, when the IC 23 is present in the region 5 of FIG. 5, only the region 5 may be subjected to measurement and comparison.

An artificial intelligence (AI)-based big data analysis technique may be applied to implementation of the disclosure. In the disclosure, such a technique may be applied to, for example, a process of generating the distribution data storage unit 484 and identifying a defective component by consulting generated distribution data. In other words, in generating distribution data, measured temperature values of all components used in the production process and defectiveness or non-defectiveness actually identified in connection with the measured temperature values are used as big data, and at least some of data analysis, processing, and resultant information generation may be performed on the big data by using at least one of machine learning, a neural network, and a deep learning algorithm as a rule-based algorithm or an AI algorithm.

Also, in the disclosure, such a technique may be used for generating the cause-of-defect database 486 and deriving the cause of defect by consulting the generated cause-of-defect database 486 for a measured temperature of a component which is actually tested. In other words, to generated the cause-of-defect database 486, measured temperature values of all components used in the production process and the causes of defect actually identified in connection with the measured temperature values are used as big data, and an AI algorithm may also be applied to the big data.

Specifically, such an algorithm may be executed by the processor 42, and the processor 42 may perform functions of a training unit and a recognition unit together. For example, the training unit may perform a function of generating a trained neural network, and the recognition unit may perform a function of recognizing (or inferring, predicting, estimating, or identifying) data through the trained neural network. The training unit may generate or update a neural network. The training unit may acquire training data to generate a neural network. Training data for the distribution data storage unit 484 is data of temperature values and defectiveness or non-defectiveness corresponding to the temperature values, and training data for the cause-of-defect database 486 is data of temperature values and the causes of defect corresponding to the temperature values.

Before training a neural network with training data, the training unit may preprocess the acquired training data or select data to be used for training from among the plurality of pieces of training data. For example, the training unit may process the training data in a preset format, filter the training data, or add or remove noise, thereby processing the training data in a form of data appropriate to training.

A trained neural network may include a plurality of neural networks (or layers). Nodes of the plurality of neural networks have weights, and the plurality of neural networks may be connected to one another so that an output value of one neural network may be used as an input value of another neural network. Examples of a neural network may include a convolutional neural network (CNN) model, a deep neural network (DNN) model, a recurrent neural network (RNN) model, a restricted Boltzmann machine (RBN) model, a deep belief network (DBN) model, a bidirectional recurrent deep neural network (BRDNN) model, and a deep Q-network model.

Meanwhile, the recognition unit acquires target data to identify defectiveness or non-defectiveness and the cause of defect. The target data is a temperature of a test-target component which is identified by the measurement unit 422 based on an image captured by the infrared camera 30. Before applying the target data to the trained neural network, the recognition unit may preprocess the acquired target data or select data to be used for recognition from among the plurality of pieces of target data. For example, the recognition unit may process the target data in a preset format, filter the target data, or add or remove noise, thereby processing the target data in a form of data appropriate to recognition. The recognition unit may acquire output values output from the neural network by applying the preprocessed target data to the neural network. According to various embodiments, the recognition unit may acquire probability values (or reliability values) together with the output values.

The above-described disclosure provides an effective method of detecting a defective component with an infrared camera in a production process.

Also, it is identified whether a component requires a retest together with whether the component is defective so that a defective component may be detected further effectively.

Moreover, a database of various causes of defect is built, and thus it is possible to reason out an expected cause of defect for a defective component or a retest component. Accordingly, a component can be effectively retested, and the database can be used in checking a production line to remove a frequent cause of defect.

According to the disclosure, it is possible to detect a defective component in a production process using an infrared camera and also identify whether a component requires a retest.

In addition, a database of various types of causes of defect is built, and thus it is possible to reason out an expected cause of defect for a defective component or a retest component. Accordingly, a component can be effectively retested, and the database can be used in checking a production process to remove a frequent cause of defect.

Although exemplary embodiments of the disclosure have been shown and described, the disclosure is not limited to the above-described specific embodiments. Various modifications and variations can be made by those skilled in the art without departing from the spirit of the disclosure as defined by the claims. These modifications and variations should not be understood separately from the technical spirit and prospect of the disclosure.

What is claimed is:

1. A method comprising:
   (a) applying driving power to a test-target component;
   (b) measuring a temperature of the test-target component, to which the driving power is applied, with an infrared camera;
   (c) comparing data of the measured temperature with a predetermined reference value of a normal component, to thereby produce a comparison result;
   (d) based on the comparison result, identifying whether or not the test-target component is a defective component;
   (e) storing distribution data corresponding to statistical information of measured temperature values of a plurality of test-target components, the distribution data being represented as a graph to define a normal area based on an average or median of measured temperatures of the plurality of test-target components and defective areas corresponding to outer areas on the left and right sides of the normal area;
   (f) comparing the data of the measured temperature with the distribution data when the test-target component is not defective based on the identification result of (d); and
   (g) identifying whether the test-target component is a normal component having a temperature which is within a range of the normal area or a defective component having a temperature which is within a range of the defective areas based on the comparison result of (f).

2. The method of claim 1, wherein in (c), the predetermined reference value comprises at least one of:
   a reference temperature of the normal component at a specific time point;
   a difference value between temperatures measured at a plurality of time points after power is applied to the normal component; and
   a temperature change rate measured after the power is applied to the normal component.

3. The method of claim 1, wherein
   (b) comprises measuring a temperature of each of a plurality of regions obtained by dividing an entire region of the test-target component, and
   (c) comprises comparing a temperature measured from each of the regions with a reference value provided for each of the regions.

4. The method of claim 1, wherein in (e), the graph of the distribution data further defines retest areas corresponding to areas between the normal area and the defective areas; and
   wherein (g) comprises identifying whether the test-target component is a retest component which is within a range of the retest areas based on comparing the data of the measured temperature with the distribution data, and identifying the test-target component as the normal component when the test-target component does not require a retest.

5. The method of claim 4, wherein in (g), the identification of the retest component is performed for the test-target component which is not identified as a defective component based on the identification result of (d).

6. The method of claim 4, further comprising:
   (h) applying the driving power to the retest component for a predetermined time or more until the retest component has a saturated operation temperature; and
   (i) re-identifying whether or not the retest component is a defective component by measuring the saturated operation temperature.

7. The method of claim 6, further comprising (j) generating a cause-of-defect database for a plurality of retest components, which are corresponding to the retest component, by storing a cause of defect identified by an actual test result of the test-target component, which is identified as the defective component in (d) or identified as the retest component in (g) and then finally identified as the defective component, together with information on a position in the distribution data.

8. The method of claim 7, further comprising (k) identifying an expected cause of defect for the test-target component by consulting the cause-of-defect database generated in (j) for the comparison result of (c) or the comparison result of (f).

9. An apparatus comprising:
   an infrared camera configured to capture an image of a test-target component to which driving power is applied;
   a storage unit configured to store a predetermined reference value of a normal component; and
   a processor configured to:
      measure a temperature of the test-target component based on the image captured by the infrared camera,
      compare data of the measured temperature with the predetermined reference value stored in the storage unit to thereby produce a comparison result, and
      identify whether or not the test-target component is a defective component based on the comparison result,
   wherein the storage unit stores distribution data corresponding to statistical information of measured temperature values of a plurality of test-target components, the distribution data being represented as a graph to define a normal area based on an average or median of measured temperatures of the plurality of test-target components and defective areas corresponding to outer areas on the left and right sides of the normal area, and
   the processor is configured to compare the data of the measured temperature with the distribution data stored in the storage unit when the test-target component is not defective based on the identification result, and identify whether the test-target component is a normal component having a temperature which is within a range of the normal area or a defective component having a temperature which is within a range of the defective areas.

10. The apparatus of claim 9, wherein the predetermined reference value comprises at least one of:
- a reference temperature of the normal component at a specific time point;
- a difference value between temperatures measured at a plurality of time points after power is applied to the normal component; and
- a temperature change rate measured after the power is applied to the normal component.

11. The apparatus of claim 9, wherein the processor is configured to measure a temperature of each of a plurality of regions obtained by dividing an entire region of the test-target component, and compare a temperature measured from each of the regions with a reference value provided for each of the regions.

12. The apparatus of claim 9, wherein
the graph of the distribution data further defines retest areas corresponding to areas between the normal area and the defective areas, and
the processor is configured to further identify whether the test-target component is a retest component which is within a range of the retest areas based on comparing the data of the measured temperature with the distribution data, and identify the test-target component as the normal component when the test-target component does not require a retest.

13. The apparatus of claim 12, wherein the processor is configured to identify the retest component for the test-target component which is not identified as a defective component.

14. The apparatus of claim 12, wherein the processor is configured to re-identify whether or not the retest component is a defective component based on a saturated operation temperature after the driving power is applied to the retest component until the retest component has the saturated operation temperature.

15. The apparatus of claim 14, wherein the storage unit stores a cause-of-defect database by storing a cause of defect identified by an actual test result of the test-target component, which is identified as the defective component by the processor or identified as the retest component and then finally identified as the defective component by the processor, together with information on a position in the distribution data.

16. The apparatus of claim 15, wherein the processor is configured to consult the cause-of-defect database stored in the storage unit for data of the temperature measured from the test-target component, which is identified as the defective component or the retest component, and identify an expected cause of defect for the test-target component based on a consulting result.

* * * * *